Patented Apr. 21, 1953

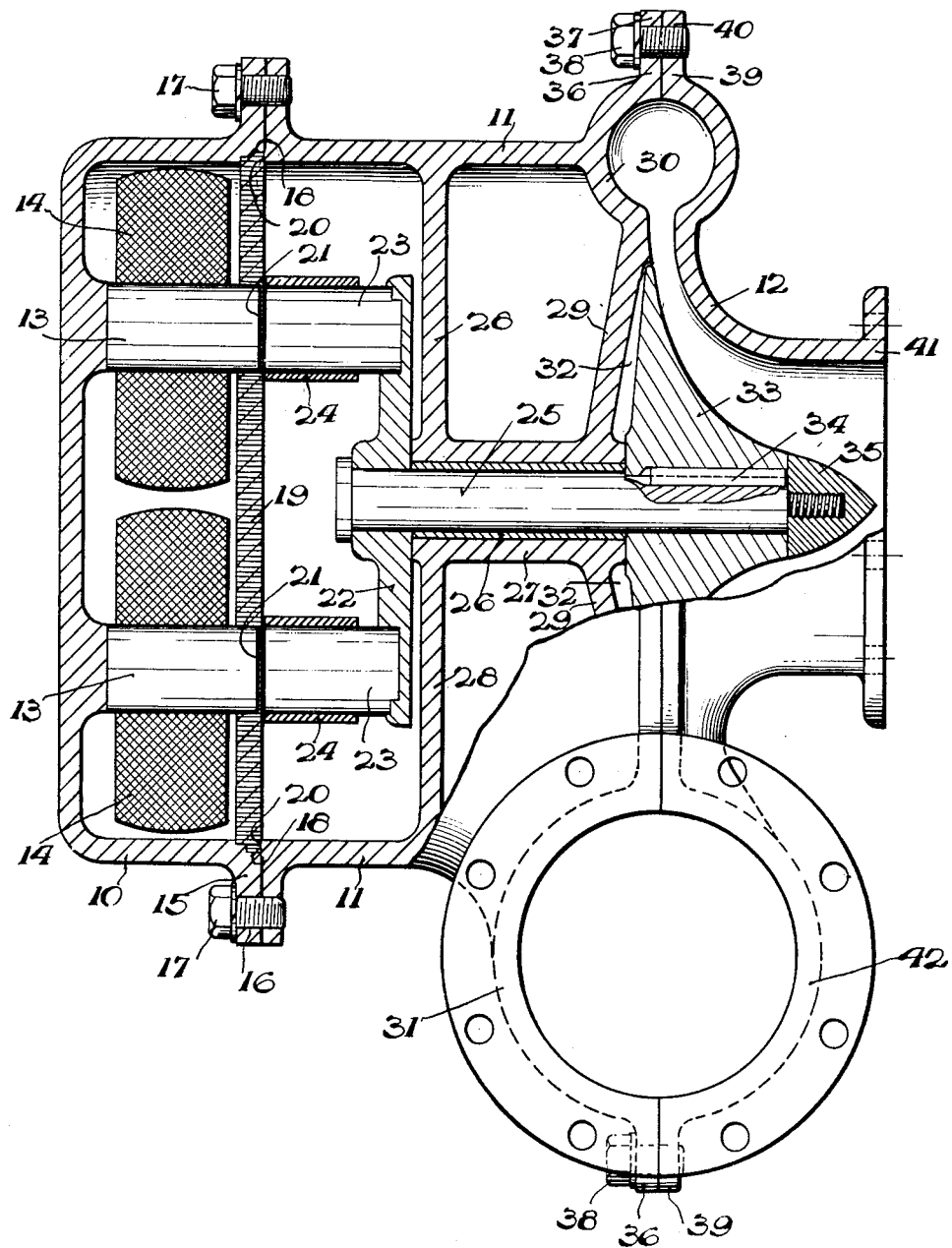

2,635,547

UNITED STATES PATENT OFFICE 2,635,547

AXIAL GAP ELECTRIC MOTOR-DRIVEN PUMP

John B. Cataldo, Annandale, N. J., assignor, by mesne assignments, to John B. Pierce Foundation, New York, N. Y., a corporation of New York Application January 19, 1948, Serial No. 3,042

2 Claims. (Cl. 103—87)

This invention relates to pumps and more particularly to pump and motor combinations in which there are no external shafts requiring packing glands or leakproof bearings.

Heretofore pump and motor combinations have been proposed but in most of these the drive shaft from the motor requires at least one packing gland or leakproof bearing where it passes into the pump housing. In many installations such a packing gland or bearing is unobjectionable and satisfactory but such glands or bearings soon deteriorate and leak in installations where high temperature fluids or fluids which chemically react with the packing of the gland or with the bearing material are being pumped.

It is accordingly an object of the present invention to provide a novel pump and motor combination in which no packing glands or leakproof bearings are required.

Another object is to provide such a combination in which there are no external shafts requiring leakproof bearings or glands.

Another object is to provide such a combination which is assembled in a unitary housing.

Another object is to provide such a combination in which the motor is an axial air gap electric motor driving a pump through a shaft having no external bearings or glands.

Another object is to provide such a combination in which the stator of the axial air gap motor is protected from the fluid being pumped by a nonmagnetic partition interposed between the stator and the rotor.

Another object is to provide such a combination which is compact, simple, efficient and relatively cheap and easy to assemble.

The pump and motor combination of my invention is capable of many mechanical embodiments and is capable of use with many of the high temperature heat transfer materials, including the tetra-aryl ortho silicates, and with fluids which will have a deteriorating action upon conventional packing materials and upon conventional leakproof bearings. One embodiment of my invention is shown in the accompanying drawing to illustrate the same and will be described hereinafter as used for pumping tetra-aryl ortho silicates. This embodiment and the description thereof should in no way be construed as defining or limiting my invention and reference should be had to the appended claims for this purpose.

The tetra-aryl ortho silicates are heat transfer compounds described in the Johnston Patent No. 2,335,012 dated November 23, 1943. These compounds have an approximate range of use from −60° F. to 700° F. and within this range are an efficient heat transfer medium. It has been found that at high temperatures the tetra-aryl ortho silicates will in time cause deterioration of known packing materials with resulting leaks at glands and bearings. Such leaks are highly undesirable because, among other things, of the waste of the tetra-aryl ortho silicate.

Referring particularly to the drawing, an embodiment of my combination pump and motor is there shown in which the housing of the pump and motor is formed in three sections 10, 11 and 12. Section 10 encloses the stator of the axial air gap type electric motor having suitable pole pieces 13 for the stator formed integrally therewith. Pole pieces 13 may support any suitable type of windings 14 to provide the magnetic flux required. Section 10 includes an outwardly extending rim 15 which is suitably apertured at 16 to receive bolts 17 which secure section 10 to housing section 11.

Housing section 10 is internally and circumferentially grooved at 18 to receive a diaphragm 19. Diaphragm 19 is of a suitable nonmagnetic material such as mica or one of the synthetic resins resistant to high temperatures and to deterioration by the fluid being pumped. Groove 18 and diaphragm 19 are so fitted as to form a fluid-tight seal when housing sections 10 and 11 are bolted together, section 11 having an annular shoulder 20 which bears upon diaphragm 19 and forces diaphragm 19 into groove 18. Diaphragm 19 may be of any suitable thickness. Since it is desirable to reduce the gap between the stator and the rotor to a minimum diaphragm 19 may be recessed at 21 to receive pole pieces 13 leaving a thin section of diaphragm 19 over each pole piece 13.

Housing section 11 contains the rotor 22 of the motor. Rotor 22 includes pole pieces 23 which may carry suitable windings 24 of the non-insulated type conventional in induction motors. Pole pieces 23 project toward diaphragm 19 with a minimum clearance therebetween. Rotor 23 is mounted upon and is suitably secured to a shaft 25 which is mounted for rotation in a suitable bearing 26 carried by bearing support 27 formed in section 11. A partition 28 is connected to bearing support 27 adjacent rotor 22 and forms a chamber with housing 11 for rotor 22. A partition 29 is connected to the other end of bearing support 27 and also forms a part of the pump housing including a part of the valute casing 30 and part 31 of the discharge port. Partition 29 is cut away at 32 to give suitable clearance between pump impeller 33 and partition 29.

Impeller 33 is mounted for rotation on shaft 25 and is suitably secured thereto as by key 34 and nut 35. Section 11 is provided with an outwardly extending rim 36 which is apertured at 37 to receive bolts 38 to secure housing section 11 to housing section 12, section 12 being provided with a cooperating rim 39 apertured and internally threaded at 40 to receive bolts 38. Housing section 12 forms a chamber for impeller 33 and is provided with a flanged fluid inlet 41 and a flanged portion 42 cooperating with part 31 to form the fluid discharge port. The abutting faces of housing sections 10, 11 and 12 are nicely machined to secured fluid-tight joints when bolts 17 and 38 are tightened. When desirable gaskets may be placed between these surfaces to assure such joints.

With the pump and motor combination of my invention organized as above described when it is desired to use the same for circulating tetra-aryl ortho silicate at high temperatures in a system employing such tetra-aryl ortho silicate flanged inlet 41 is connected into the system at any suitable point and discharge port 31—42 is also connected into the system. Electric energy is then supplied to windings 14 and rotor 22 is rotated thus rotating shaft 25 and impeller 33. Rotation of impeller 33 draws the tetra-aryl ortho silicate into housing section 12 and expels it by centrifugal action into volute casing 30 and out of the discharge port 31—42. Some of the tetra-aryl ortho silicate may from time to time work through bearing 26 and into the rotor chamber in housing section 11 but tetra-aryl ortho silicate in this chamber is not objectionable since it can have no effect on the non-insulated windings 24 and may give a certain amount of lubricating effect. These silicates have no effect on the non-insulated windings 24 because they do not attack the metals of the windings. The tetra-aryl ortho silicate which finds its way into the rotor chamber is blocked by diaphragm 19 from entering the stator chamber and therefore can do no damage to the stator windings.

It will now be apparent that by the present invention I have provided a novel pump and motor combination in which no packing glands or leakproof bearings are required; in which there are no external shafts requiring packing glands or leakproof bearings; in which the combination is mounted in a unitary housing; in which an axial type air gap electric motor drives the pump through a shaft having no external bearings or glands; in which the stator of the motor is protected from the fluid being pumped; and which is compact, simple, efficient and relatively cheap and easy to assemble.

Changes to or modifications of the illustrative embodiment of my invention may now be suggested to those skilled in the art without departing from my inventive concept and reference should be had to the appended claims to determine the scope of this invention.

What is claimed is:

1. In a pump as described, a housing comprising two axially aligned portions, an axial air gap electric motor mounted in said housing, including an axially spaced stator and rotor, a nonmagnetic diaphragm, between said stator and said rotor and forming a fluid tight compartment with the first portion of said housing and enclosing said stator, a shaft operatively connected to said rotor, an impeller mounted on said shaft, said shaft, rotor, and impeller being enclosed by the second portion of said housing, a bearing in which said shaft is journaled, said bearing being supported by the second portion of the housing and disposed between said rotor and said impeller, the housing being provided with a fluid inlet port and a fluid discharge port adjacent said impeller and in communication therewith.

2. In a pump as described, a housing formed of at least three parts joined in axial alignment in fluid-tight relation, an axial air gap electric motor including a stator disposed in one of said parts, and a rotor disposed in the next adjacent part, a nonmagnetic diaphragm secured in a fluid-tight seal between said one part and the said next adjacent part and disposed opposite and proximate to said stator, a bearing in said second named part, a shaft rotatably mounted in said bearing and extending into the third housing part and having said rotor mounted thereon opposite and proximate to said diaphragm and a pump impeller mounted on said shaft in said third part.

JOHN B. CATALDO.

References Cited in the file of this patent

UNITED STATES PATENTS

| Number | Name | Date |
|---|---|---|
| 592,244 | Fay | Oct. 26, 1897 |
| 1,119,648 | Sheldon | Dec. 1, 1914 |
| 2,245,577 | Dieckman | June 17, 1941 |
| 2,592,752 | Shenstone | Apr. 15, 1952 |